US008223612B2

United States Patent
Kang

(10) Patent No.: US 8,223,612 B2
(45) Date of Patent: Jul. 17, 2012

(54) OPTICAL PICKUP APPARATUS

(75) Inventor: Do Won Kang, Gwangju-si (KR)

(73) Assignee: LG Electronics Inc., Seoul (KR)

( * ) Notice: Subject to any disclaimer, the term of this patent is extended or adjusted under 35 U.S.C. 154(b) by 1202 days.

(21) Appl. No.: 11/646,252

(22) Filed: Dec. 28, 2006

(65) Prior Publication Data

US 2007/0153665 A1    Jul. 5, 2007

(30) Foreign Application Priority Data

Dec. 29, 2005 (KR) .................. 10-2005-0132814

(51) Int. Cl.
*G11B 7/00* (2006.01)
(52) U.S. Cl. ......... 369/112.03; 369/112.04; 369/112.06; 369/112.07; 369/112.11; 369/112.12
(58) Field of Classification Search ............... 369/109.1, 369/112.04, 109.2, 110.03, 112.05, 112.01, 369/112.03, 112.06, 112.07, 112.11, 112.12; 385/37; 359/576, 569
See application file for complete search history.

(56) References Cited

U.S. PATENT DOCUMENTS

| | | | |
|---|---|---|---|
| 5,115,423 A * | 5/1992 | Maeda et al. | 369/44.23 |
| 5,636,190 A * | 6/1997 | Choi | 369/44.23 |
| 7,548,359 B2 * | 6/2009 | Murakami et al. | 359/15 |
| 2002/0003766 A1 * | 1/2002 | Kadowaki et al. | 369/112.07 |
| 2003/0169667 A1 * | 9/2003 | Nishi et al. | 369/112.02 |
| 2004/0257960 A1 * | 12/2004 | Fujii | 369/112.05 |
| 2005/0122861 A1 * | 6/2005 | Park et al. | 369/44.37 |
| 2005/0226106 A1 * | 10/2005 | Hwang et al. | 369/44.28 |
| 2006/0018235 A1 * | 1/2006 | Mori | 369/112.01 |
| 2007/0019530 A1 * | 1/2007 | Kawamura et al. | 369/120 |

FOREIGN PATENT DOCUMENTS

KR    10-2005-0055480 A    6/2005

* cited by examiner

*Primary Examiner* — Wayne Young
*Assistant Examiner* — Dionne Pendleton
(74) *Attorney, Agent, or Firm* — Birch, Stewart, Kolasch & Birch, LLP

(57) ABSTRACT

An optical pickup apparatus according to an embodiment includes a semiconductor laser, an objective lens, a grating, and a light detecting device. The grating is installed between the semiconductor laser and the objective lens to divide the light beam emitted from the semiconductor laser into three beams or more including a main beam and a sub-beam. The light detecting device receives the divided light reflected by the optical recording medium. The grating includes a first diffraction grating and a second diffraction grating. The first diffraction grating has patterns formed for dividing a sub-beam with respect to a first optical recording medium having a first track pitch, and second diffraction grating has patterns formed for dividing the sub-beam divided by the first diffraction grating into sub-beams with respect to a second optical recording medium having a second track pitch.

7 Claims, 8 Drawing Sheets

OPTICAL PICKUP APPARATUS

This application claims the priority benefit of Korean Patent Application No. 10-2005-0132814, filed on Dec. 29, 2005, which is hereby incorporated by reference for all purposes as if fully set forth herein.

BACKGROUND OF THE INVENTION

1. Field of the Invention

The present invention relates to an optical pickup apparatus.

2. Description of the Related Art

Since an optical recording medium can record a high capacity data signal in high density, it is widely applied in fields requiring recording and reproduction of data.

Recently, as data such as a moving image requiring a high capacity recording medium increases, a study is in progress to manufacture a high capacity optical recording medium through reduction of a recording pit and a track pitch.

Generally, it is desirable to accurately track a light beam on a track of an optical recording medium in order to reproduce a data signal recorded by a micron unit.

Various methods are known as a method for detecting a tracking error signal (TES) for accurate tracking. A push-pull method is known as one of the simplest methods.

However, according to the push-pull method, an offset is generated to a TES when an objective lens is shifted in a radial direction or when a disk is inclined. Therefore, a differential push pull (DPP) method using three beams has been developed to remove this offset.

However, since two sub-beams need to be separated by ½ track pitch with respect to a main beam in the DPP method, it cannot be applied to an optical recording medium having a different track pitch.

For example, since either 0.74 µm or 1.23 µm can be used as a track pitch of an optical recording medium, an optical pickup apparatus that can record and reproduce a predetermined optical recording medium such as the recording medium having the 0.74 µm track pitch cannot record and reproduce another optical recording medium such as the recording medium having the 1.23 µm track pitch.

SUMMARY OF THE INVENTION

Accordingly, the present invention is directed to an optical pickup apparatus that substantially obviates one or more problems due to limitations and disadvantages of the related art.

An object of the present invention is to provide an optical pickup apparatus having a grating, capable of generating a maximum differential push pull signal with respect to optical recording media having different track pitches.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided according to an embodiment an optical pickup apparatus including: a semiconductor laser for outputting a light beam; an objective lens for condensing the light beam emitted from the semiconductor laser onto an optical recording medium; a grating installed between the semiconductor laser and the objective lens to divide the light beam emitted from the semiconductor laser into three beam or more including a main beam and a sub-beam; and a light detecting device for receiving divided light reflected by the optical recording medium, wherein the grating includes: a first diffraction grating having patterns formed for dividing a sub-beam with respect to a first optical recording medium having a first track pitch; and a second diffraction grating having patterns formed for dividing the sub-beam divided by the first diffraction grating into sub-beams with respect to a second optical recording medium having a second track pitch.

A grating according to an embodiment of the present invention includes: a first diffraction grating having patterns formed for dividing a sub-beam with respect to a first optical recording medium having a first track pitch; and a second diffraction grating having patterns formed for dividing the sub-beam divided by the first diffraction grating into sub-beams with respect to a second optical recording medium having a second track pitch.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
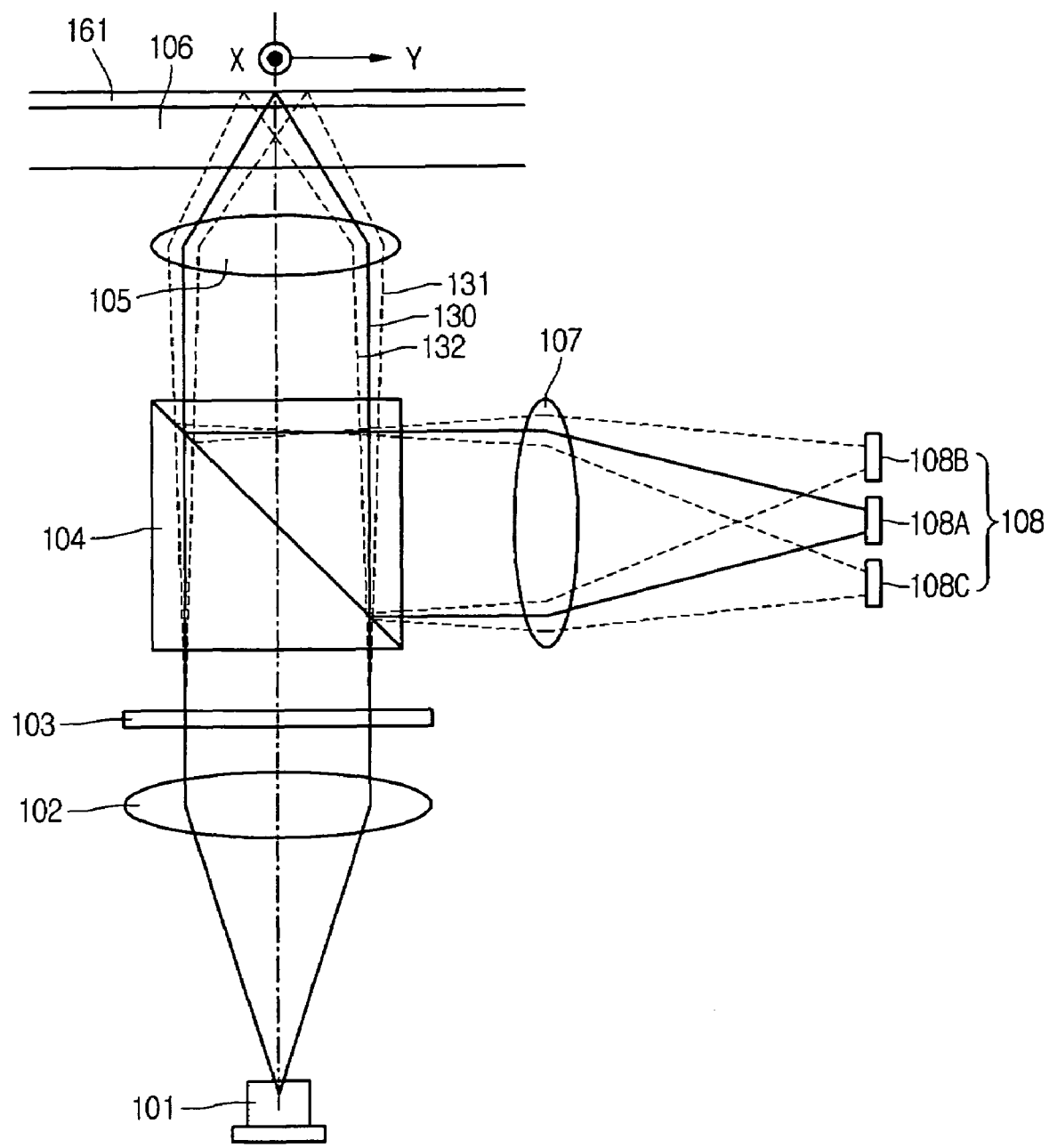
FIG. 1 is a schematic view illustrating a construction of an optical system of an optical pickup apparatus according to an embodiment of the present invention.

FIG. 1 is a schematic view illustrating a construction of an optical system of an optical pickup according to an embodiment of the present invention. Such an optical pickup can be used in any recording and/or reproducing device according to the present invention.

Referring to FIG. 1, light emitted from a laser diode 101 is changed into parallel light at a collimator 102, and is divided into a main beam 130 and two sub-beams 131 and 132 by a grating 103.

After passing through a beam splitter 104, the three beams 130, 131, and 132 are condensed onto a track 161 of an optical recording medium 106 by an objective lens 105. The three beams 130, 131, and 132 reflected by the recording medium 106 pass through the objective lens 105, and are reflected by the beam splitter 104 and guided to a light detector 108 through a condensing lens 107.

The main beam 130 and the two sub-beams 131 and 132 are received in the two-division light detector 108 having a division line corresponding to a track direction, respectively. Therefore, each of two-division light detectors 108A, 108B, and 108C of the light detector 108 generates a differential signal, i.e., a push pull (PP) signal.

According to the present invention, a grating that can generate a maximum DPP signal is provided. For instance, the grating 103 can generate a maximum DPP signal, which will be discussed in more detail below.

Figure 2:
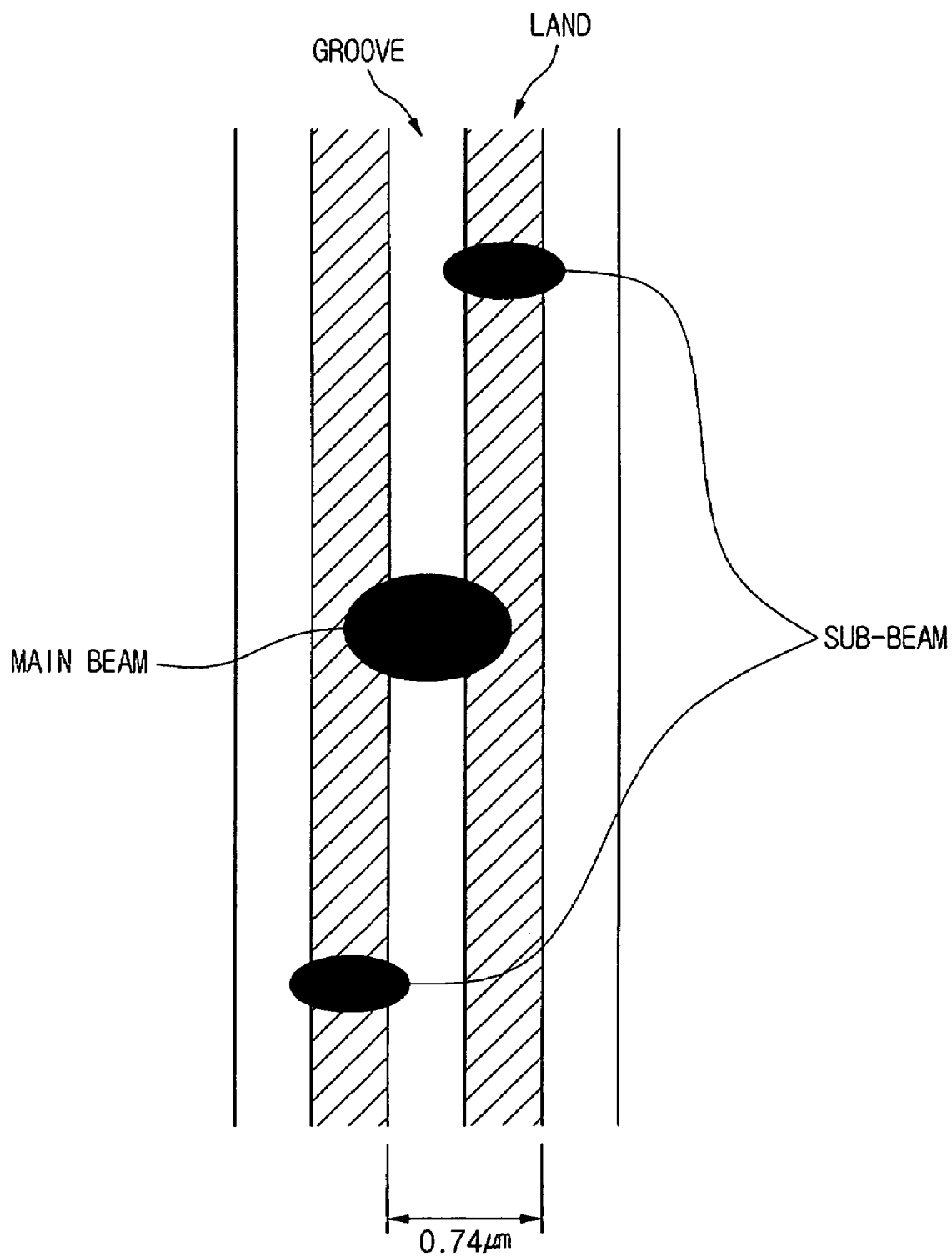
FIG. 2 is a view explaining, as an example, a position of a sub-beam for obtaining a maximum DPP signal with respect to an optical recording medium having a track pitch of 0.74 µm according to the present invention.
Figure 3:
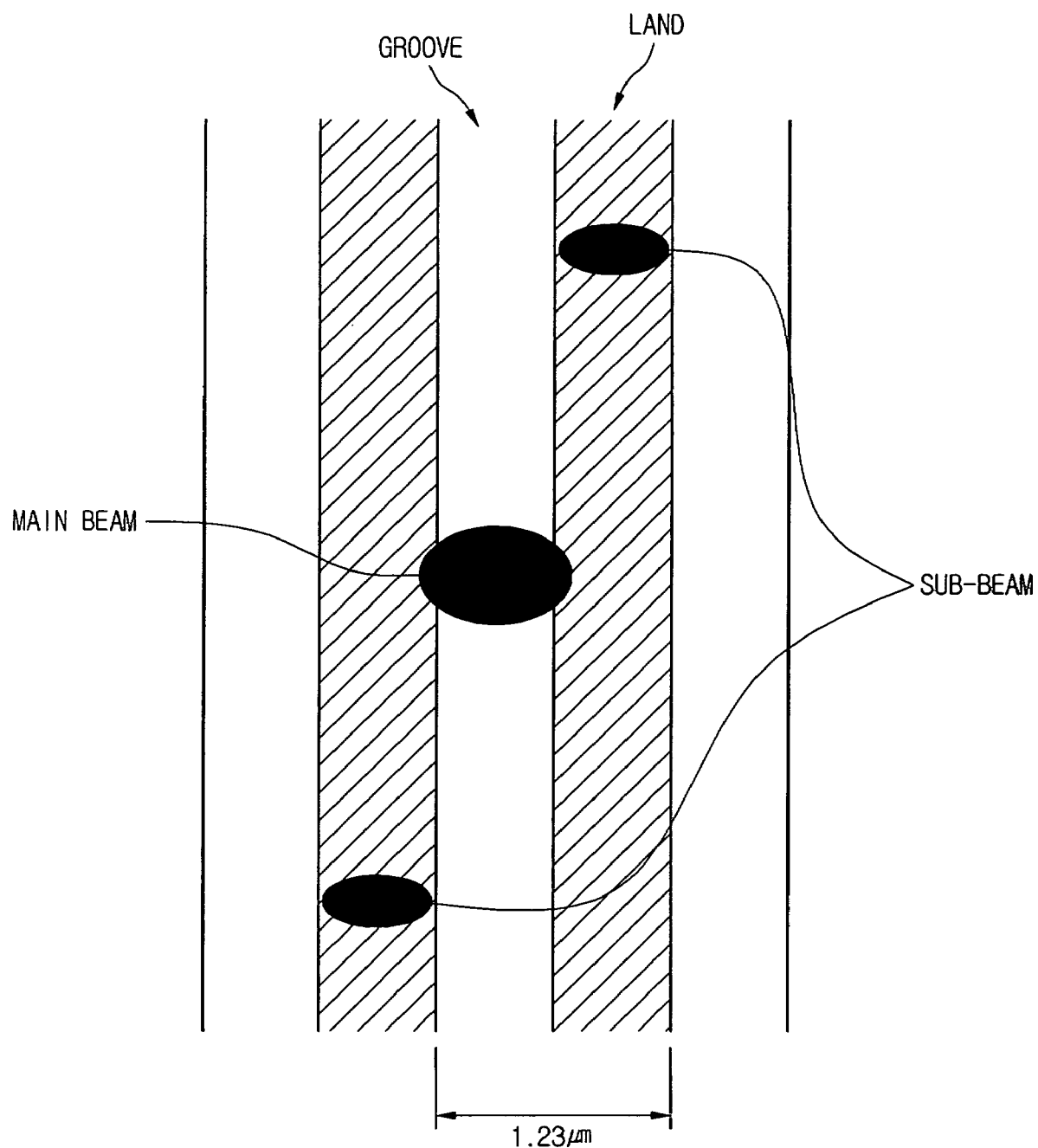
FIG. 3 is a view explaining, as an example, a position of a sub-beam for obtaining a maximum DPP signal with respect to an optical recording medium having a track pitch of 1.23 µm according to the present invention.
Figure 4:
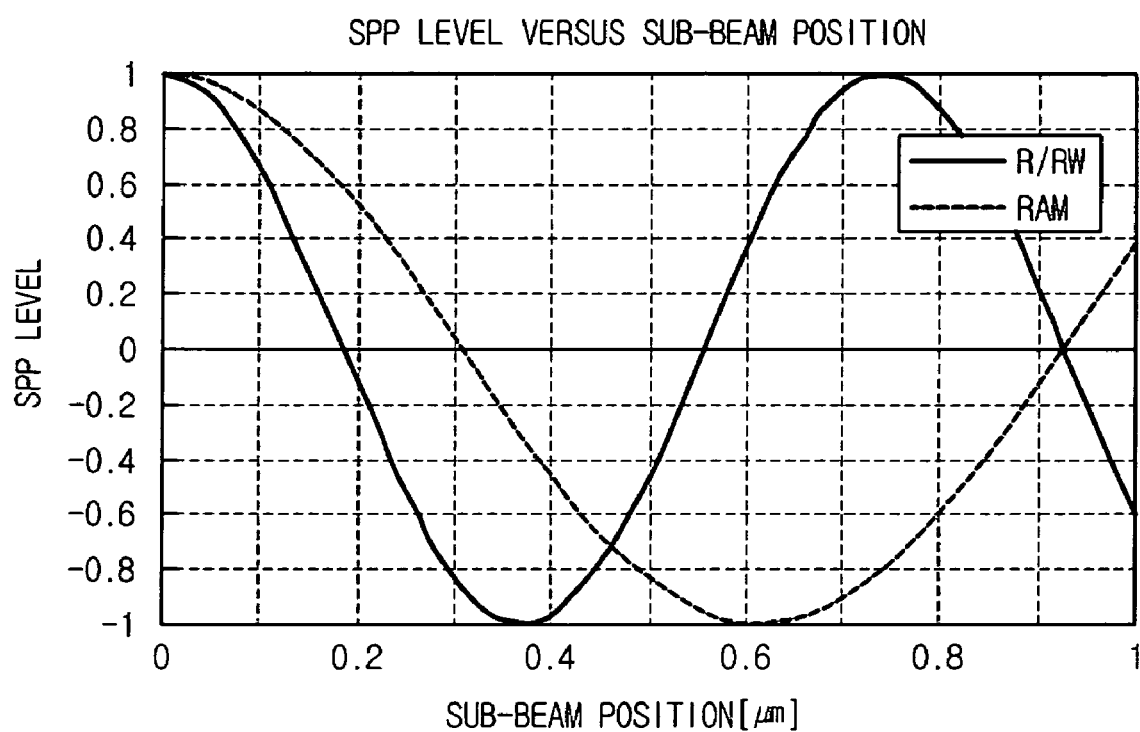
FIG. 4 is a view illustrating, as an example, a sub-beam level versus a sub-beam position of the optical recording media of FIGS. 2 and 3 according to the present invention.

FIG. 2 is a view explaining a position of a sub-beam for obtaining a maximum DPP signal with respect to an optical recording medium having a track pitch of 0.74 μm, FIG. 3 is a view explaining a position of a sub-beam for obtaining a maximum DPP signal with respect to an optical recording medium having a track pitch of 1.23 μm, and FIG. 4 is a view illustrating a sub-beam level versus a sub-beam position of the optical recording media of FIGS. 2 and 3.

The optical recording medium illustrated in FIG. 2, having the track pitch of 0.74 μm is DVD±R/±RW, which can generate a maximum DPP signal when a main beam is located in a groove and a sub-beam is located on a land, which is an intermediate portion between the grooves.

The optical recording medium illustrated in FIG. 3, having the track pitch of 1.23 μm is a DVD-RAM, which can likewise generate a maximum DPP signal when a main beam is located in a groove and a sub-beam is located on a land, which is an intermediate portion between the grooves.

Since intervals between track pitches are different from each other in FIGS. 2 and 3, positions that can generate a maximum DPP signal are different from each other.

Equation 1 below is used to calculate a DPP signal using the main beam MPP and a sub beam SPP.

$$\begin{aligned}
DPP &= MPP - k(SPP1 + SPP2) \quad &\text{Equation 1}\\
&= A\sin\theta - k\{B\sin(\theta - \Phi) + B\sin(\theta - \Phi)\}\\
&= A\sin\theta - kB\{\sin(\theta - \Phi) + \sin(\theta - \Phi)\}\\
&= A\sin\theta - 2kB\{\sin\theta\cos\Phi\} \text{ if, } k = A/2B\\
&= A\sin\theta - A\{\sin\theta\cos\Phi\} \text{ if, } \Phi = 180\\
&= 2A\sin\theta
\end{aligned}$$

where MPP (main push pull) is a push pull signal formed of a zeroth-degree beam that has passed through a grating (e.g., the grating 103), SPP is a push pull signal formed of +1/−1st degree beam that has passed through the grating, k is a correcting constant for generating a DPP signal at the maximum, θ is a phase of a sin wave formed when the main beam traverses a track, Φ is a phase difference when a phase difference is generated between sine waves of an MPP and an SPP as the main bean and the sub-beam are controlled, 'A' and 'B' are amplitudes of sin waves.

Also, referring to FIG. 4, points at which a signal level of a sub-beam is maximized change depending on a track pitch.

As descried above, diffraction grating patterns different from each other are formed on both sides of a grating according to an embodiment of the present invention in order to generate a DPP signal having a maximum sub-beam signal level with respect to optical recording media having different track pitches.

Figure 5:
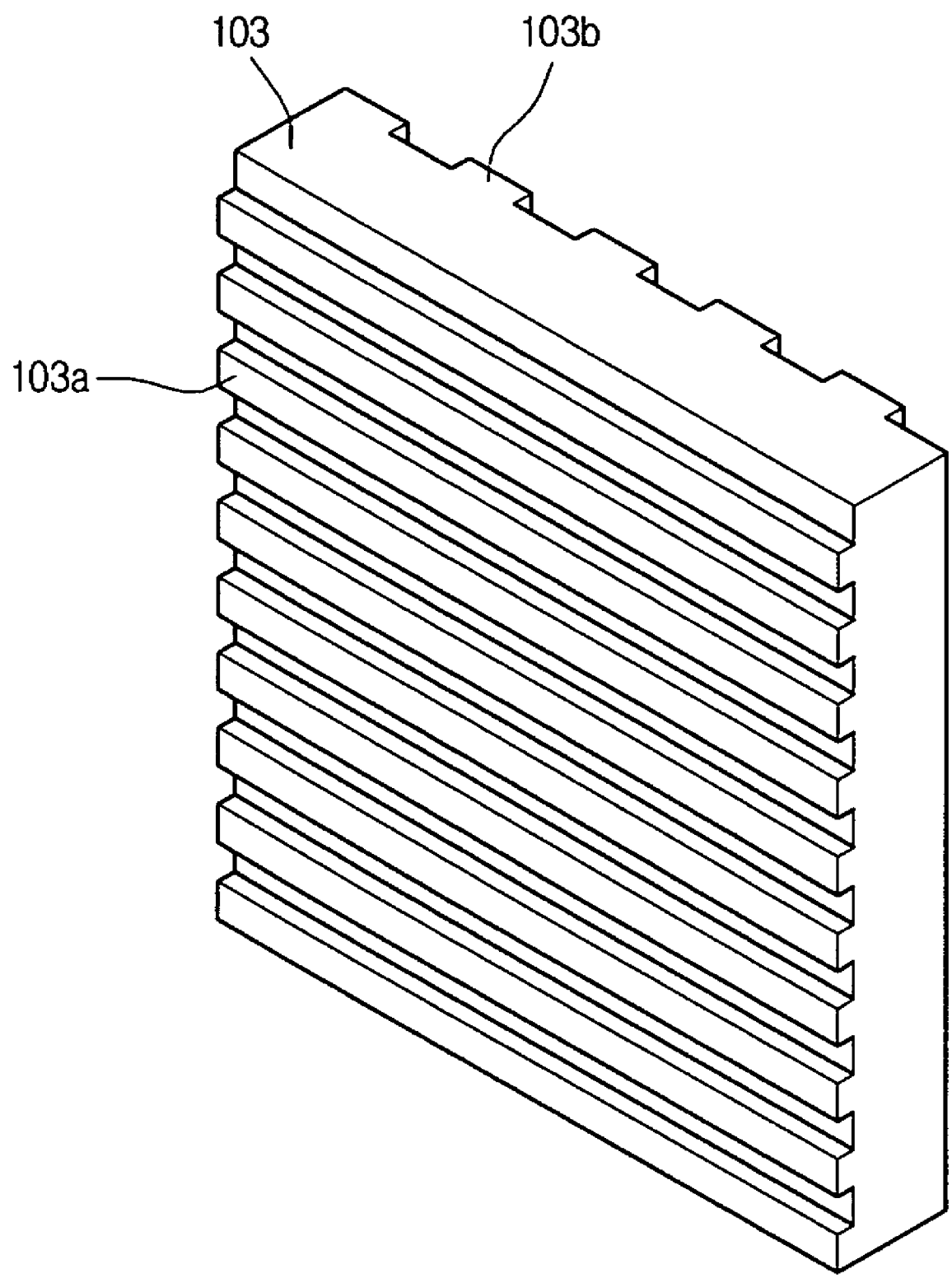
FIG. 5 is a view illustrating an example of a grating according to an embodiment of the present invention.
Figure 6:
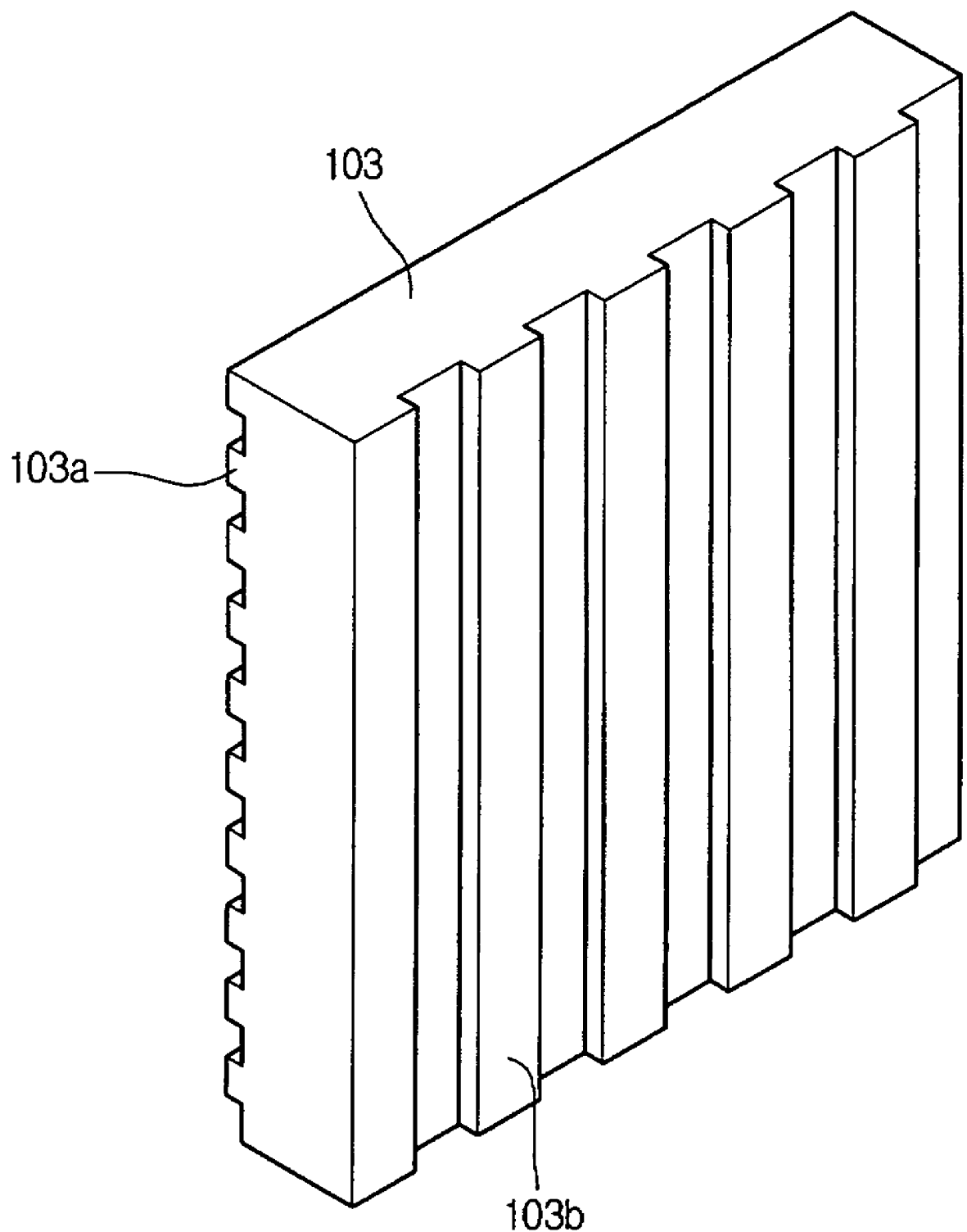
FIG. 6 is a view of the grating of FIG. 5 seen from an opposite side.

FIG. 5 is a view illustrating an example of a grating according to an embodiment of the present invention, and FIG. 6 is a view of the grating of FIG. 5 seen from the opposite side. The grating of FIGS. 5 and 6 can be the grating 103 of FIG. 1.

Figure 7:
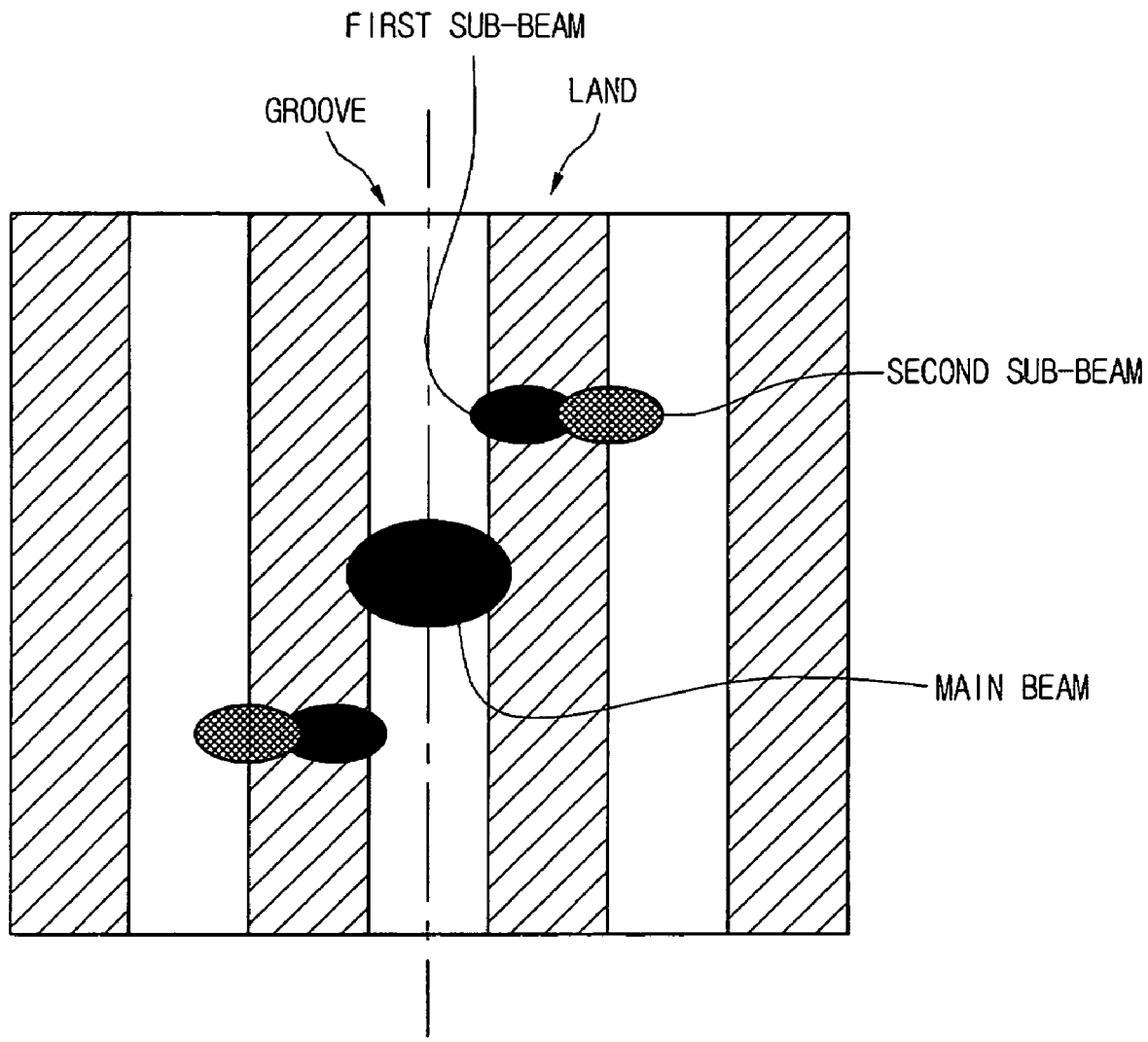
FIG. 7 is a view illustrating, as an example, a light beam that has passed through a grating of the present invention is illuminated onto a recording medium having a track pitch of 0.74 µm.
Figure 8:
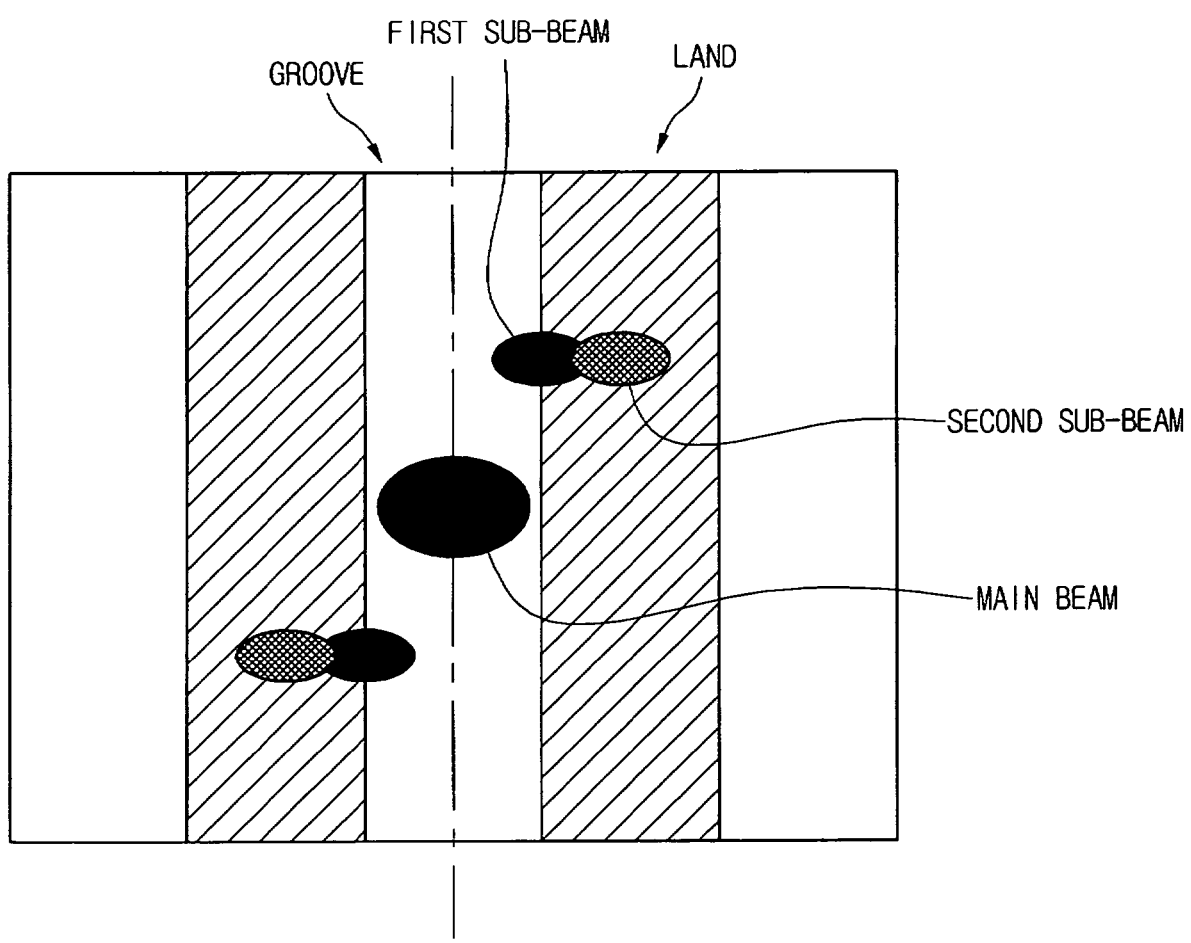
FIG. 8 is a view illustrating, as an example, a light beam that has passed through a grating of the present invention is illuminated onto a recording medium having a track pitch of 1.23 µm.

Also, FIG. 7 is a view illustrating a light beam that has passed through a grating (e.g., the grating of FIGS. 5 and 6) of the present invention is illuminated onto a recording medium having a track pitch of 0.74 μm, and FIG. 8 is a view illustrating a light beam that has passed through the grating of the present invention is illuminated onto a recording medium having a track pitch of 1.23 μm.

Referring to FIGS. 5 to 8, the grating 103 includes a first diffraction grating 103a formed in a direction in which a beam emitted from the laser diode 101 is incident, and a second diffraction grating 103b formed in a surface opposite to a surface in which the first diffraction grating pattern 103a is formed.

The second diffraction grating 103b diffracts again light diffracted by the first diffraction grating 103a to allow the diffracted light to be incident onto an optical recording medium.

For instance, a first sub-beam is accurately illuminated onto a land portion of a recording medium having a track pitch of 0.74 μm by the first diffraction grating 103a. Light reflected by the recording medium is accurately incident to a light detector, e.g., the detector 108.

Also, light is directed onto a land portion of a recording medium having a track pitch of 1.23 μm by the second diffraction grating 103b, and reflected light is incident to the light detector, e.g., the detector 108.

At this point, the first and second diffraction gratings 103a and 103b of the grating 103 are formed on both sides of the grating facing each other, respectively. Diffraction patterns of the first and second diffraction gratings 103a and 103b are perpendicular (or substantially perpendicular) to each other.

According to an embodiment, the first sub-beam generated by the first diffraction grating 103a is designed to be suitable for a recording medium having a track pitch of 0.74 μm. On the other hand, a second sub-beam generated by the second diffraction grating 103b is designed to be suitable for a recording medium having a track pitch of 1.23 μm.

However, the grating 103 can be differently designed depending on positions at which the first and second diffraction gratings face the semiconductor laser. Also, the grating 103 can have other configurations as needed.

Referring to FIGS. 7 and 8, the optical pickup apparatus including the grating 103 in which the first and second diffraction gratings 103a and 103b are formed generates a main beam and a first sub-beam and a second sub-beam. Each of the first and second sub-beams is designed to allow reflected light to be accurately incident to a light detector (e.g., detector 108) depending on a track pitch of a recording medium inserted.

An operation of the optical pickup apparatus depending on a kind/type of a recording medium will be described below according to the present invention. This operation can be performed by the optical pick apparatus of FIG. 1 or other suitable pickup.

First, the case where a recording medium such as DVD+ R/−R and DVD+RW/−RW having a relatively short track pitch of, e.g., 0.74 m is reproduced will be descried. The recording medium includes a track illustrated using grooves and lands.

According to the present invention, the main beam, and the first and second sub-beams are simultaneously illuminated onto the recording medium by the first and second diffraction gratings 103*a* and 103*b* formed in the grating 103. At this point, the main beam is illuminated over the entire width of a groove, the first sub-beam is illuminated onto almost the entire width of a land, but the second sub-beam is illuminated onto a portion of the land. Therefore, a light detector (e.g., the detector 108) can detect a maximum DPP signal using the main beam and the sub-beams reflected by the recording medium.

Second, referring to FIG. 8, in the case where a recording medium such as a DVD-RAM having a relatively long track pitch of, e.g., 1.23 μm is reproduced, the recording medium includes a track illustrated using grooves and lands in FIG. 8.

That is, the first and second diffracting gratings 103*a* and 103*b* respectively and simultaneously generate the first and second sub-beams as shown in FIG. 7 or 8, which can be respectively used to record and/or reproduce data to and from recording media having different track pitches, in an effective manner. As a result, a recording/reproducing device that has wide applicability and versatility is provided using the optical pickup apparatus of the present invention.

According to the present invention, the main beam, and the first and second sub-beams are simultaneously illuminated onto the recording medium by the first and second diffraction gratings 103*a* and 103*b* formed in the grating 103. At this point, the main beam is illuminated over almost the entire width of a groove, and the second sub-beam is illuminated onto a region occupying about 50% or more of the land. Therefore, the light detector (e.g., the detector 108) can detect a maximum DPP signal using the main beam and the second sub-beam.

Therefore, when a recording medium having a track pitch of 0.74 μm is inserted, the light detector generates a maximum DPP signal using the first sub-beam even without a separate manipulation by a user. On the other hand, when a recording medium having a track pitch of 1.23 μm is inserted, the light detector generates a maximum DPP signal using the second sub-beam.

Accordingly, an optical pickup apparatus according to an embodiment of the present invention includes a grating having a double-sided diffraction grating for generating sub-beams with respect to recording media having different track pitches to generate maximum DPP signals with respect to the recording media having different track pitches.

As described above, an optical pickup apparatus according to the present invention provides diffraction gratings having different patterns on both sides of a grating for dividing a laser beam into at least three beams, respectively, to generate two sub-beams having different pitches. Accordingly, the optical pickup apparatus can generate maximum DPP signals with respect to recording media having different track pitches to perform tracking correction.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A grating comprising:
a first diffraction grating having patterns formed for dividing a sub-beam with respect to a first optical recording medium having a first track pitch; and
a second diffraction grating having patterns formed for dividing the sub-beam divided by the first diffraction grating into sub-beams with respect to a second optical recording medium having a second track pitch,
wherein the second diffraction grating again diffracts light diffracted by the first diffraction grating to allow the diffracted light to be incident onto the second optical recording medium,
wherein the sub-beam generated by the first diffraction grating is illuminated onto a land portion of the first optical recording medium having the first track pitch and a light reflected by the first optical recording medium is incident to a light detector,
wherein the sub-beam generated by the second diffraction grating is illuminated onto a land portion of the second optical recording medium having the second track pitch and a light reflected by the second optical recording medium is incident to the light detector, and
wherein diffraction patterns of the first and second gratings are formed on opposite sides of the grating and are substantially perpendicular to each other.

2. The grating according to claim 1, wherein the first track pitch is 0.74 μm, and the second track pitch is 1.23 μm.

3. The grating according to claim 1, wherein the first diffraction grating is formed on a first surface of the grating, and the second diffraction grating is formed on a second surface of the grating.

4. An optical pickup apparatus comprising:
a light source to generate a light beam;
a grating to divide the light beam generated from the light source into a main beam and at least first and second sub-beams spaced apart from the main beam, the grating including a first diffraction grating having patterns formed for generating a sub-beam with respect to a first optical recording medium having a first track pitch and a second diffraction grating having patterns formed for generating a second sub-beam with respect to a second optical recording medium having a second track pitch, and the second diffraction grating again diffracting light diffracted by the first diffraction grating to allow the diffracted light to be incident onto the second optical recording medium,
wherein the second sub-beam is spaced apart from the main beam further than the first sub-beam; and
an objective lens to direct the main beam and the at least first and second sub-beams towards the first or second optical recording medium having the first or second track pitch,
wherein a collimator is disposed between the light source and the grating,
wherein the first sub-beam generated by the first diffraction grating is illuminated onto a land portion of the first optical recording medium having the first track pitch and a light reflected by the first optical recording medium is incident to a light detector,
wherein the second sub-beam generated by the second diffraction grating is illuminated onto a land portion of the second optical recording medium having the second track pitch and a light reflected by the second optical recording medium is incident to the light detector, and wherein the first and second grating patterns are respectively formed on first and second sides of the grating and are substantially perpendicular to each other.

5. The optical pickup apparatus according to claim 4, wherein the first track pitch of the first optical recording medium is 0.74 μm.

6. The optical pickup apparatus according to claim 4, wherein the second track pitch of the second optical recording medium is 1.23 μm.

7. The optical pickup apparatus according to claim 4, further comprising:

a splitter to receive the light reflected from the first or second optical recording medium and direct the received light towards a light detector; and the light detector configured to receive the light from the splitter and to convert the received light into a signal.

\* \* \* \* \*